(12) United States Patent
Kabatek et al.

(10) Patent No.: US 12,347,405 B2
(45) Date of Patent: Jul. 1, 2025

(54) ADJUSTING THE BRIGHTNESS OF A DISPLAY

(71) Applicant: Continental Automotive Technologies GmbH, Hannover (DE)

(72) Inventors: Ulrich Kabatek, Babenhausen (DE); Kai Hohmann, Babenhausen (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/266,886

(22) PCT Filed: Dec. 7, 2021

(86) PCT No.: PCT/DE2021/200250
§ 371 (c)(1),
(2) Date: Jun. 13, 2023

(87) PCT Pub. No.: WO2022/128019
PCT Pub. Date: Jun. 23, 2022

(65) Prior Publication Data
US 2024/0046902 A1 Feb. 8, 2024

(30) Foreign Application Priority Data
Dec. 17, 2020 (DE) ............... 10 2020 216 172.0

(51) Int. Cl.
*G09G 5/10* (2006.01)
(52) U.S. Cl.
CPC ....... *G09G 5/10* (2013.01); *G09G 2320/0626* (2013.01); *G09G 2360/16* (2013.01); *G09G 2370/045* (2013.01); *G09G 2380/10* (2013.01)

(58) Field of Classification Search
CPC .......... G09G 5/10; G09G 2320/0626; G09G 2360/16; G09G 2370/045; G09G 2380/10
See application file for complete search history.

(56) References Cited

U.S. PATENT DOCUMENTS

| | | | |
|---|---|---|---|
| 6,559,826 B1* | 5/2003 | Mendelson | G09G 3/2092 345/207 |
| 2010/0182354 A1* | 7/2010 | Shiratsuchi | G09G 3/36 345/697 |

(Continued)

FOREIGN PATENT DOCUMENTS

| | | |
|---|---|---|
| DE | 102015215180 A1 | 2/2017 |
| DE | 112019001298 T5 | 12/2020 |

(Continued)

OTHER PUBLICATIONS

Search Report dated Sep. 10, 2021 from corresponding German patent application No. 10 2020 216 172.0.

(Continued)

*Primary Examiner* — Liliana Cerullo
(74) *Attorney, Agent, or Firm* — Buchanan Ingersoll & Rooney PC

(57) ABSTRACT

A method for adjusting the brightness of a display in a vehicle, to a display system having display electronics that are configured to carry out such a method, and to a vehicle that has a corresponding display system is disclosed. The method comprises selecting a region of the display, the region being defined by a number of pixels that is less than the number of pixels of the display, and incorporating a brightness value into the selected region each pixel in the selected region being assigned the same brightness value and the brightness value being associated through a calculation rule with each pixel of the selected region.

12 Claims, 2 Drawing Sheets

(56) References Cited

U.S. PATENT DOCUMENTS

| | | | |
|---|---|---|---|
| 2013/0049608 A1 | 2/2013 | Tatavoosian et al. | |
| 2014/0085360 A1* | 3/2014 | Ohno et al. | |
| 2019/0088193 A1* | 3/2019 | Tada | G06F 3/04845 |
| 2020/0320919 A1* | 10/2020 | Zhou | G09G 5/00 |
| 2021/0043151 A1 | 2/2021 | Nawata et al. | |

FOREIGN PATENT DOCUMENTS

| | | |
|---|---|---|
| GB | 2576064 A | 2/2020 |
| JP | 2020112668 A | 7/2020 |

OTHER PUBLICATIONS

International Search Report and Written Opinion dated Mar. 9, 2022 from corresponding International patent application No. PCT/DE2021/200250.

* cited by examiner

ADJUSTING THE BRIGHTNESS OF A DISPLAY

CROSS REFERENCE TO RELATED APPLICATIONS

This U.S. patent application claims the benefit of PCT patent application No. PCT/DE2021/200250, filed Dec. 7, 2021, which claims the benefit of German patent application No. 10 2020 216 172.0, filed Dec. 17, 2020, both of which are hereby incorporated by reference.

TECHNICAL FIELD

The present disclosure relates to adjusting the brightness of a display.

BACKGROUND

For analog displays in a vehicle, it is conventional that different regions of the display, for example tubes in the case of an instrument cluster, are organized so that they may be dimmed differently to a large extent. Very fine balancing of the brightness conditions is thereby possible. This balancing is then further adjusted as a function of the ambient brightness.

It is known that the human eye may process a brightness range of about 14 orders of magnitude, although of these only about 3 orders of magnitude (corresponding to a factor of 1000) may be distinguished simultaneously. By varying the viewing direction onto a brighter or darker region, however, the eye adapts and may then distinguish such a factor in both regions. Overall, a factor of much more than 1000 may thus be distinguished when the adaptation is also taken into account.

In contrast, the current technology of displays is limited to driving with 8 bits each (corresponding to 256 levels) for the primary colors R/G/B. More recent displays offer up to 10 bits for this (corresponding to 1024 levels) per primary color, and therefore cover the dynamic range of the eye for a homogeneous image. Correspondingly, the standard for the outputs of graphics units is likewise typically 8 bits, and for more recent instruments up to 10 bits.

If, however, a plurality of discrete regions having different contents instead of a homogeneous image are intended to be represented on a display, it would be desirable to be able to adjust them in their basic brightness as in the case of analog displays. However, a resolution of 8 bits or 10 bits is not sufficient for this.

Alternatively, it is possible to display discrete regions respectively on their own display and to dim the respective display separately. This, however, is very expensive, complicated and above all scarcely feasible for freely shaped regions. Varying the positions of individual regions in a solution that provides a plurality of displays, in order to provide discrete regions, is likewise not simple to achieve.

It is therefore an object of the present disclosure to overcome at least one of the aforementioned disadvantages.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to a first aspect of the present disclosure, a method for adjusting a brightness of a display in a vehicle comprises selecting a region of the display, the region being defined by a number of pixels that is less than the number of pixels of the display, and incorporating a brightness value into the selected region, each pixel in the selected region being assigned the same brightness value and the brightness value being associated through a calculation rule with each pixel of the selected region.

In this way, a dynamic brightness range greater than that delivered by a graphics unit may be implemented in the display. With the method, a multiplicity of different regions may be selected on the display and varied in their brightness. Overall, the method represents a simple and efficient way in which individual regions of a display may be adjusted in their brightness when the display may implement a dynamic brightness range greater than that delivered by the graphics unit.

Regions may for example be used for video signals to be overlaid, which are accommodated as an independent window on the display, for example for a night vision camera. By the disclosure, regions that are covered by transparent or semitransparent plastic may be illuminated differently. Furthermore, regions may be provided with optical filters that also result in a different backlighting requirement.

The selection of a region is carried out in the present case in order to adjust, or change, the brightness of the selected region. The selection of a region may involve establishing one or more regions that are intended to receive a brightness value so as to adjust, or change, this region in brightness, for example in order to dim this region. Selection may in the present case also mean that an already established region is selected in order to incorporate a brightness value in this region.

The brightness value may in this case be incorporated once as a fixed numerical value, so that the brightness or dimming that a selected region receives is established definitively by the incorporation. The brightness value may, however, also be kept variable so that the brightness of a region may also be varied, or set, after the incorporation.

In one embodiment of the disclosure, the brightness value may therefore be set variably and the method additionally comprises the step: adjusting the brightness of a selected region by varying the brightness value.

Incorporation of the brightness value into a selected region may be carried out as a function of the display location.

In one embodiment, the method comprises selection of a multiplicity of regions of the display. In this case, the method comprises incorporation respectively of a brightness value in each of the multiplicity of selected regions, so that the brightness of at least a first selected region differs from at least a second selected region. The effect achieved by such a method is that dimming as in an analog display may be carried out in a vehicle having a plurality of tubes.

In another embodiment of the present disclosure, the method comprises selection of at least three regions of the display and incorporation of a brightness value respectively in each of the three selected regions, so that the brightness of each of the three regions differs.

It is to be understood that the regions may be selected in such a way that they have different shapes and a different number of pixels. For example, a first selected region could have a circular shape and a second selected region could have a rectangular shape, the number of pixels of the first region being greater than the number of pixels of the second region. It is furthermore to be understood that, in an embodiment in which a multiplicity of regions are selected, each of the selected regions has a different position on the display.

For example, the selected regions are spaced apart from one another in such a way that there is an unselected region between individual regions. An unselected region then separates selected regions from one another and no brightness value is incorporated in the unselected region. For example, in an embodiment in which a multiplicity of regions are selected, the sum of the number of pixels of the selected regions is less than the number of pixels of the overall display.

The brightness value may for example be jointly incorporated as a brightness factor and/or brightness offset for the region, that is to say through multiplication of the brightness value by the corresponding pixels and/or through addition of the brightness value to the corresponding pixels. The calculation rule in this case corresponds to a linear association of the brightness value with each pixel of the selected region.

In another embodiment of the present disclosure, the calculation rule is a linear, nonlinear, zonal and/or integral association of the brightness value with each pixel of the selected region. A multiplicity of different calculation rules may be used in order to associate a brightness value with a pixel. A different effect for a region may be achieved, depending on which calculation rule is used.

Different calculation rules may also be used in various selected regions. For example, the same brightness value may be assigned to different regions when incorporating the brightness value, although the brightness value may be associated with the respective pixels through different calculation rules. The brightness of different regions may also be adjusted accordingly by this procedure.

In another embodiment of the present disclosure, the brightness value is associated through the calculation rule with all RGB values of every pixel in the selected region. Each pixel has three subpixels R, B and G. For the association of brightness values with RGB values, the value of each subpixel of a selected region is therefore associated with the brightness value through the calculation rule.

In one embodiment of the present disclosure, the calculation rule is a linear, nonlinear, zonal and/or integral association of RGB values of each pixel of the selected region with the brightness value.

Since multiplication is relatively complicated, a shift operation that corresponds to multiplication by a power of two may also be carried out instead. In order then to produce different factors, a compensating correction may be carried out in the graphics unit. For example, if a factor of 7 (darker) is intended to be achieved but only shifts may be used, it is reduced to a factor of 8 darker in the display and the region is in turn made brighter by a factor of (about) 1.14, so that 7 is obtained as the product.

In another embodiment of the present disclosure, the method additionally comprises multiplication of the brightness value by an additional factor. The additional factor is in this case incorporated in a number of pixels of a selected region that is less than the number of pixels of the selected region. In this way, it is possible to provide a particular number of pixels of a selected region additionally with a weighting factor. For example, a factor weighted according to the position could be incorporated only into pixels that are located at the edge of a selected region, in order to produce a region that does not have steep edges.

Display electronics according to the disclosure are configured in such a way that they carry out a method according to the disclosure. The display electronics are part of the display system having a graphics unit, a first data channel and a display device, the display device comprising the display electronics and a display. The graphics unit is operationally connected to the display electronics via a first data channel in order to provide image and/or video information items to the display device. These image and/or video information items contain data that are intended to be shown on the display. In the present case, for example, the representation of tubes, the speed display, engine speeds, overlaid signals of a night vision camera, etc. It is to be understood that the image and/or video information items may contain real-time information items. The graphics unit may be part of a computer unit.

In one embodiment of the present disclosure, a region to be selected is stored in a fixed fashion in the display electronics. It is to be understood that the display electronics are configured accordingly. For example, one or more regions may be stored by fixed programming in the display electronics. Only the fixed set is then available in the display electronics. Selection of the region is then carried out by selecting a region stored in a fixed fashion. Such an embodiment offers the advantage that no additional information items are needed for the selection of the region, and a fixed repertoire of one or more regions may be accessed.

In another embodiment of the present disclosure, an information item that is contained in the image and/or video information causes the display electronics to select a region. This embodiment offers the advantage that the corresponding information items relating to the region that is intended to be selected are contained in data that are intended to be shown anyway via the display by the display electronics. Furthermore, corresponding regions to be selected may be established directly by the additional information items.

The information item that is contained in the image and/or video information may in this context contain an instruction to the display electronics for establishing one or more regions into which a brightness value is intended to be incorporated. The information item may, however, also contain an instruction to the display electronics to select an already established region, in order to incorporate a brightness value in the established region. For example, the graphics unit may have a color depth of 10 bits each for R/G/B. If only 9 of these bits are used in each case for the driving within a region, a selection of 8 regions may be carried out with the three remaining bits, i.e. one bit per color channel. If the same brightness value is incorporated in a plurality of regions, even more regions may be driven. Overall, the selection between a plurality of different brightnesses for a plurality of regions is straightforwardly possible in this case.

In another embodiment of the present disclosure, the image and/or video information causes the display electronics to incorporate a brightness value into a selected region.

In another embodiment of the present disclosure, the display system comprises a second data channel, the second data channel operationally connecting the graphics unit to the display electronics and control information items being transmitted from the graphics unit to the display electronics via the second data channel. The second data channel is separate from the first data channel, and is not used to provide the display electronics with graphics and/or video information items from the graphics unit.

In one embodiment of the present disclosure, the display electronics are configured in such a way that regions, which are intended to be selected, may be programmed freely by control information items that are received via the second data channel. In this way, the selection of regions may be kept very variable. Programming may, for example, be carried out with a list of maximum and minimum columns of a region.

In another embodiment of the present disclosure, the control information items cause the display electronics to select a region. Depending on the information that is contained in the control information items, they may cause the display electronics to establish one or more regions into which a brightness value is intended to be incorporated, for example by programming. The control information items may, however, also cause the display electronics to select an already established region, in order to incorporate a brightness value. Such an embodiment provides additional possibilities for the way in which the brightness may be adjusted in regions.

In another embodiment of the present disclosure, the control information items cause the display electronics to incorporate a brightness value in a selected region.

In another embodiment of the present disclosure, the display system comprises a brightness adjustment module. The brightness adjustment module is arranged inside the vehicle so that it may be operated by a passenger. The brightness adjustment module is furthermore operationally connected to the display device and is configured in such a way that, by the brightness adjustment module, a passenger in the vehicle may select a region of the display and may incorporate a brightness value in the region, and/or may vary the brightness of the selected region by corresponding settings on the brightness adjustment module.

This additionally makes it possible for a passenger to carry out individual changes of the brightness of individual regions on the display. For example, a plurality of regions that may be selected by the passenger are in this case already stored in a fixed fashion. Furthermore, a brightness value is for example already incorporated in the corresponding region, the brightness value of a region to be selected by the passenger being kept variable so that the passenger may change the brightness value for a selected region on the brightness adjustment module.

In order to implement the method on a display, many different types of displays may be envisioned. For example, a color depth of 10 bits may be produced with a normal LCD display by dithering. The method according to the invention may in this case be used with an 8 bit graphics unit. 10 bit displays may, for example, be expanded to 12 bit displays by 10 bit+2 bit dithering. Here, above all, methods with an 8 bit or 10 bit graphics unit are advantageous. OLED displays allow greater color depths. In OLED displays, the calculation rule of the association may be regulated via the OLED current of each subpixel. In particular, micro-LEDs may be driven with a very much greater dynamic range. Here as well, the calculation rule of the association may be regulated via the micro-LED current of each subpixel.

A vehicle according to the present disclosure comprises a display system according to the disclosure.

BRIEF DESCRIPTION OF THE DRAWINGS

Further features of the present disclosure will be evident from the following detailed description and the appended claims in conjunction with the figures, wherein:

DETAILED DESCRIPTION

For a better understanding of the principles of the present disclosure, embodiments of the disclosure will be explained in more detail below with the aid of the figures. The same references are used in the figures for identical or functionally identical elements and are not necessarily described again for each figure. It is understood that the disclosure is not limited to the illustrated embodiments and that the described features may also be combined or modified without departing from the scope of protection of the disclosure as defined in the appended claims.

Figure 1:
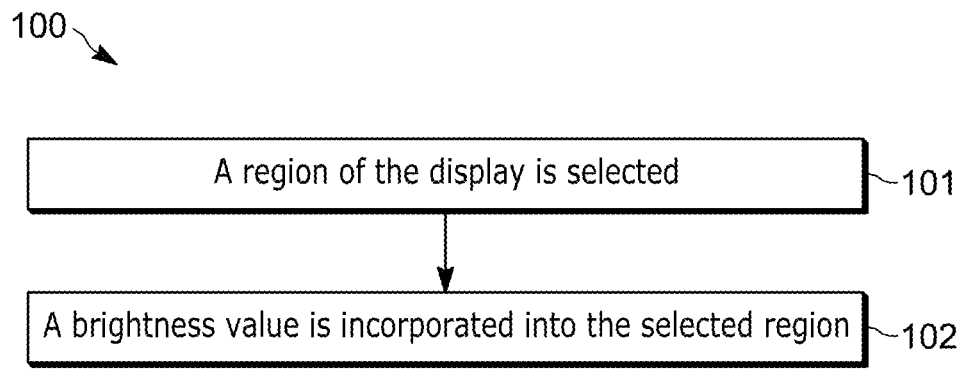
FIG. 1 schematically shows a first embodiment of a method according to the disclosure for adjusting a brightness of a display in a vehicle.

FIG. 1 shows a schematic representation of an embodiment of a method 100 according to the disclosure for adjusting a brightness of a display in a vehicle. In a first step 101, a region of the display is selected. The region is selected in such a way that the number of pixels of the selected region is less than the number of pixels of the overall display. In principle, the selection may be made so that the selected region has an arbitrary shape, for example circular, rectangular, elliptical or polygonal.

In a second step 102, a brightness value is incorporated into the selected region. In this case, each pixel in the selected region is assigned the same brightness value, which is associated with each pixel of the selected region through a calculation rule. The brightness value and the calculation rule are established by the incorporation. In this way, the brightness of the selected region is established by the brightness value respectively incorporated and the calculation rule used.

Figure 2:
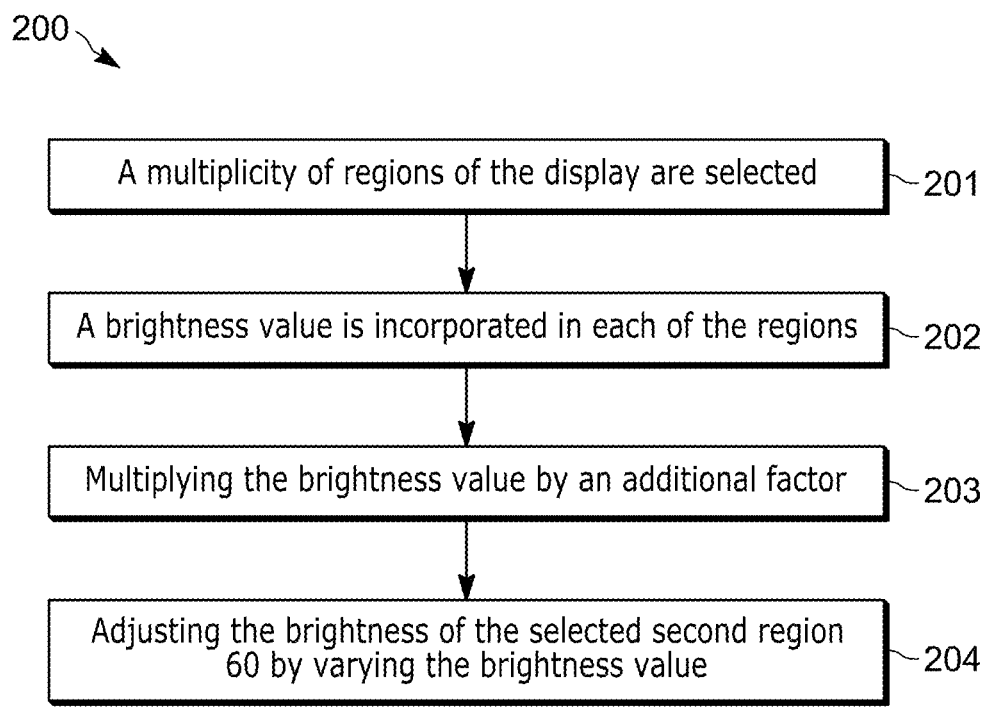
FIG. 2 schematically shows a second embodiment of a method according to the disclosure for adjusting a brightness of a display in a vehicle.
Figure 4:
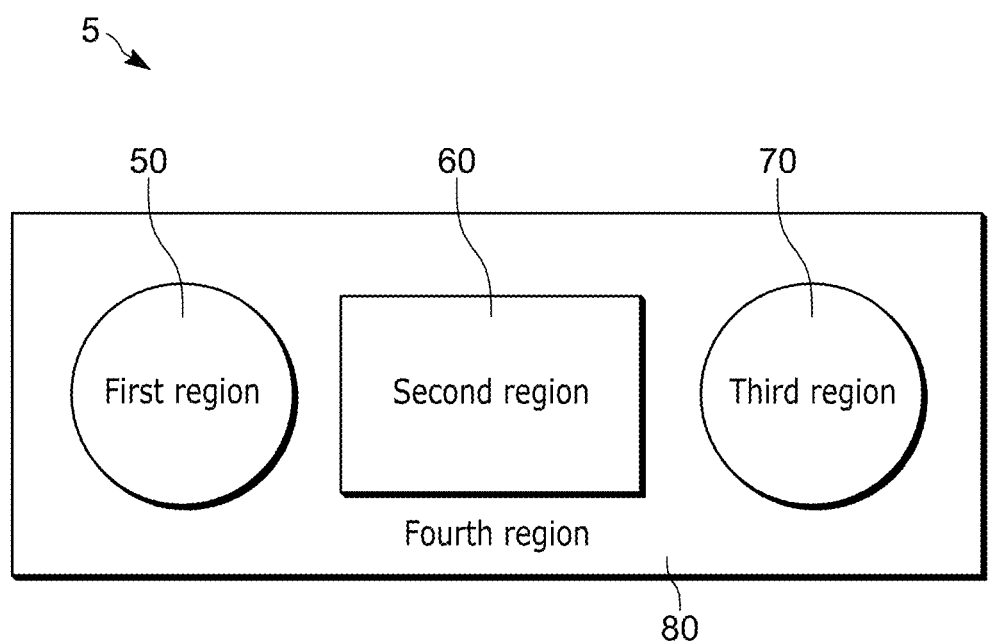
FIG. 4 schematically shows a display on which the method according to the disclosure as represented in FIG. 2 is implemented.

FIG. 2 shows a schematic representation of an alternative embodiment of a method 200 according to the disclosure. The embodiment described in FIG. 2 differs from the embodiment described in FIG. 1 in that a multiplicity of regions, in the present case three regions 50, 60, 70, of the display 5 are selected in a first step 201 by the display electronics. A schematic representation of the display 5, on which the method described in FIG. 2 is implemented, is represented in FIG. 4. Each of the three regions 50, 60, 70 in this case has a number of pixels that is less than the total number of pixels of the display. Furthermore, the sum of the pixels of the selected three regions 50, 60, 70 is less than the total number of pixels of the display. The display in FIG. 4 therefore shows a fourth region 80, although this is not selected.

In a second step 202, a brightness value is incorporated in each of the three regions 50, 60, 70. In this case, the incorporation 202 is carried out so that a first brightness value is incorporated in the first selected region 50, a second brightness value is incorporated in the second region 60, and a third brightness value is incorporated in the third region 70. Each pixel in the selected first region 50 is assigned the first brightness value, each pixel in the selected second region 60 is assigned the second brightness value, and each pixel in the selected third region is assigned the third brightness value. Each of the three brightness values is in this case associated through a calculation rule with each pixel of the corresponding selected region 50, 60, 70 so that the brightness value is associated with all RGB values of each pixel of the corresponding selected region 50, 60, 70.

For example, the first brightness value is associated through a calculation rule with all RGB values of each pixel in the first region 50, the second brightness value is associated through a calculation rule with all RGB values of each pixel in the second region 60, etc.

In the three selected regions 50, 60, 70, all RGB values are associated via a nonlinear quadratic calculation rule with the respective brightness value.

The method 200 furthermore comprises the step of multiplying 203 the brightness value by an additional factor. The additional factor is in this case only assigned to a number of pixels of the selected second region 60 that is less than the number of pixels of the selected second region 60. The additional factor is assigned exclusively to pixels that form the edge of the second region 60. In this way, the region may be separated more clearly from a surrounding fourth region 80.

The brightness values of the first region 50 and the third region 70 are established in a fixed fashion by the incorporation 202 of the brightness value. The brightness value which has been incorporated into the second region 60, however, can be set variably and, for the second region 60, the method 200 additionally comprises the step 204 of adjusting the brightness of the selected second region 60 by varying the brightness value.

Figure 3:
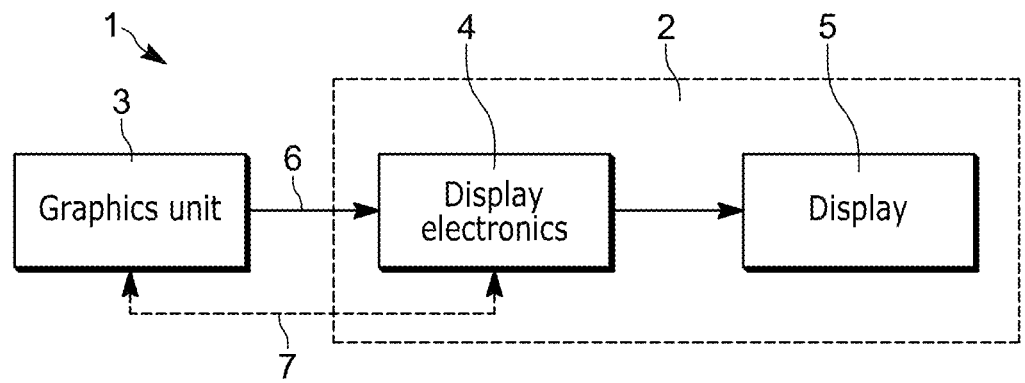
FIG. 3 schematically shows a display system that carries out the method according to the disclosure according to FIG. 2.

FIG. 3 schematically shows a display system 1 that carries out the method according to the disclosure according to FIG. 2. The display system 1 is installed in a vehicle (not represented).

The display system 1 comprises a display device 2, a graphics unit 3, a first data channel 6 and a second data channel 7. The display device 2 in this case comprises display electronics 4 and a display 5, here a TFT display.

The TFT display. The graphics unit 3 is part of a computer unit (not represented). The graphics unit 3 is operationally connected to the display electronics 4 both via the first data channel 6, here an LVDS line (LVDS: Low Voltage Differential Signaling) and via the second data channel 7, here a serial data bus, for example an Inter-Integrated Circuit I-2-C. The second data channel 7 serves to transmit control information items from the graphics unit 3 to the display electronics 4. The first data channel 6 is used to provide the display device 2 with image and/or video information items. The image and/or video information items are processed by the display electronics 4 and shown on the display 5. The image and/or video information items contain information items relating to the RGB values that are intended to be assigned to the pixels. The regions 50, 60, 70 shown in FIG. 4 are thus formed. At this point, however, no adjustment of the brightness is yet carried out. The regions 50, 60, 70 would therefore have the same brightness.

In order to adjust the brightness of the regions 50, 60, 70, the image and/or video information items contain information items that cause the display electronics 4 to select the three regions 50, 60, 70. Via the second data channel 7, the display electronics 4 furthermore receive information items from the graphics unit 3, which cause the display electronics 4 to incorporate a corresponding brightness value into the three selected regions 50, 60, 70.

Optionally, one or more regions to be selected may be stored in a fixed fashion in the display electronics 4. Optionally, one or more regions to be selected may also be contained in control information items that are provided to the display electronics 4 via the second data channel 7 by the graphics unit 3. Optionally, the image and/or video information items may contain an information item that causes the display electronics 4 to incorporate a brightness value into one or more selected regions.

The display system 1 furthermore comprises a brightness adjustment module (not represented). The brightness adjustment module is arranged inside the vehicle and may be operated by a passenger in order to change the brightness of a region. The brightness adjustment module is for this purpose operationally connected to the display device 2. Here, the brightness adjustment module is configured so that the second region 60 of the display 5 may be selected, and the brightness value of the second region 60 may be set variably, by the passenger.

The invention claimed is:

1. A method for adjusting a brightness of a display in a vehicle, the method comprising:
   selecting a first region of the display, the first region being defined by a number of pixels less than the number of pixels of the display;
   selecting a second region of the display, the second region being defined by a number of pixels less than the number of pixels of the display;
   selecting a third region of the display, the third region being defined by a number of pixels less than the number of pixels of the display, wherein each of the first region, the second region, and the third region are spaced apart from one another such that there is an unselected region between the first region, the second region, and the third region;
   incorporating a first brightness value into the selected first region, a second brightness value into the selected second region, and a third brightness value into the selected third region, wherein each pixel in the selected first region is assigned the first brightness value, wherein each pixel in the selected second region is assigned the second brightness value, wherein each pixel in the selected third region is assigned the third brightness value, wherein each brightness value of the selected first region, second region and third region is associated with a nonlinear quadratic calculation rule, and wherein the brightness value of each of the three selected regions differs; and
   multiplying the brightness value by an additional factor, wherein the additional factor is only assigned to a number of pixels of the selected second region that is less than the number of pixels of the selected second region, and wherein the additional factor is assigned exclusively to pixels that form the edge of the second region to separate the second region from the unselected region of the display.

2. The method as claimed in claim 1, wherein the method further comprises adjusting brightness of the selected second region by varying the brightness value.

3. A display system in a vehicle comprising:
   a display device comprising:
      a display; and
      display electronics, wherein the display electronics are configured to select a first region of the display, the first region being defined by a number of pixels less than the number of pixels of the display, wherein the display electronics are configured to select a second region of the display, the second region being defined by a number of pixels less than the number of pixels of the display, wherein the display electronics are configured to select a third region of the display, the third region being defined by a number of pixels less than the number of pixels of the display, wherein each of the first region, the second region, and the third region are spaced apart from one another such that there is an unselected region between the first region, the second region, and the third region, and incorporate a first brightness value into the selected first region, a second brightness value into the selected second region, and a third brightness value into the selected third region, wherein each pixel in the selected first region is assigned the first brightness value, wherein each pixel in the selected second region is assigned the second brightness value, wherein each pixel in the selected third region is assigned the third brightness value, wherein each brightness value of the selected first region, second region and third region is associated with a nonlinear quadratic calculation rule, wherein the brightness value of each of the three selected region differs, wherein multiplying the brightness value by an additional factor is performed, wherein the additional factor is only assigned to a number of pixels of the selected second region that is less than the number of pixels of the selected second region, and wherein the additional factor is assigned exclusively to pixels that form the edge of the second region to separate the second region from the unselected region of the display; and a graphics unit, wherein the graphics unit is operationally connected to the display electronics via a first data channel, wherein the first data channel is a low voltage differential signaling line, in order to provide image or video information items to the display device.

4. The display system as claimed in claim 3, wherein the first region and third region selected are stored in a fixed fashion in the display electronics.

5. The display as claimed in claim 4, wherein the image or video information items contain an information item that causes the display electronics to select the region and to incorporate the brightness value into the selected region.

6. The display as claimed in claim 4, wherein the image or video information items contain an information item that causes the display electronics to select the region or to incorporate the brightness value into the selected region.

7. The display system as claimed in claim 4, wherein the display system comprises a second data channel, the second data channel operationally connecting the graphics unit to the display electronics and control information items being transmitted from the graphics unit to the display electronics via the second data channel, the control information items causing the display electronics to select the region and to incorporate the brightness value into the selected region.

8. The display system as claimed in claim 4, wherein the display system comprises a second data channel, the second data channel operationally connecting the graphics unit to the display electronics and control information items being transmitted from the graphics unit to the display electronics via the second data channel, the control information items causing the display electronics to select the region or to incorporate the brightness value into the selected region.

9. The display system as claimed in claim 3, wherein the image or video information items contain an information item that causes the display electronics to select the region and to incorporate the brightness value into the selected region.

10. The display system as claimed in claim 3, wherein the image or video information items contain an information item that causes the display electronics to select the region or to incorporate the brightness value into the selected region.

11. The display system as claimed in claim 3, wherein the display system comprises a second data channel, wherein the second data channel operationally connects the graphics unit to the display electronics and control information items are transmitted from the graphics unit to the display electronics via the second data channel, the control information items causing the display electronics to select the region and to incorporate the brightness value into the selected region.

12. The display system as claimed in claim 3, wherein the display system comprises a second data channel, wherein the second data channel operationally connects the graphics unit to the display electronics and control information items are transmitted from the graphics unit to the display electronics via the second data channel, the control information items causing the display electronics to select the region or to incorporate the brightness value into the selected region.

* * * * *